United States Patent
Chen

(10) Patent No.: US 10,429,561 B2
(45) Date of Patent: Oct. 1, 2019

(54) PUDDLE LIGHT

(71) Applicant: Young Optics Inc., Hsinchu (TW)

(72) Inventor: S-Wei Chen, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 113 days.

(21) Appl. No.: 15/485,529

(22) Filed: Apr. 12, 2017

(65) Prior Publication Data

US 2018/0170244 A1 Jun. 21, 2018

(30) Foreign Application Priority Data

Dec. 16, 2016 (TW) ............................ 105219325 U

(51) Int. Cl.
| | |
|---|---|
| B60Q 1/32 | (2006.01) |
| G02B 5/32 | (2006.01) |
| G03B 21/00 | (2006.01) |
| B60Q 1/50 | (2006.01) |

(52) U.S. Cl.
CPC .............. *G02B 5/32* (2013.01); *B60Q 1/323* (2013.01); *G03B 21/001* (2013.01); *B60Q 1/50* (2013.01); *B60Q 2400/50* (2013.01)

(58) Field of Classification Search
CPC .... G02B 5/32; G03B 21/001; G03B 21/2033; G03B 21/204; B60Q 1/50; B60Q 1/525; B60Q 1/0052; B60Q 1/24; B60Q 1/245; B60Q 1/2665; B60Q 1/2669; B60Q 1/2696; B60Q 1/323; B60Q 1/326; B60Q 1/48–488; B60R 1/1207; B60R 2001/1215; B60R 2400/40; B60R 2400/50

See application file for complete search history.

(56) References Cited

U.S. PATENT DOCUMENTS

| | | | | |
|---|---|---|---|---|
| 5,355,188 A | * | 10/1994 | Biles .................... | G03B 21/132 348/E9.027 |
| 7,175,321 B1 | | 2/2007 | Lopez | |
| 2009/0013922 A1 | | 1/2009 | Lin | |
| 2009/0122548 A1 | * | 5/2009 | Dalsgaard ............. | F21S 10/007 362/282 |
| 2011/0273671 A1 | | 11/2011 | Chu | |
| 2012/0147333 A1 | * | 6/2012 | Jorgensen ............. | G03B 33/06 353/31 |
| 2012/0320102 A1 | * | 12/2012 | Jorgensen ............. | F21S 10/007 345/690 |
| 2014/0055252 A1 | | 2/2014 | Ascencio | |
| 2014/0191859 A1 | * | 7/2014 | Koelsch ................ | H02J 7/0047 340/455 |

FOREIGN PATENT DOCUMENTS

CN 102767782 A 11/2012

* cited by examiner

*Primary Examiner* — Anh T Mai
*Assistant Examiner* — Steven Y Horikoshi
(74) *Attorney, Agent, or Firm* — WPAT, PC

(57) ABSTRACT

An illumination apparatus for vehicles includes a light source, a fixed-image light valve, and a projection-lens set. The light source may generate illumination light of one or multiple various areas, and the fixed-image light valve has a fixed image of one or multiple various areas, respectively corresponding to the illumination light of one or the multiple various areas to transform the illumination light into image beam. The projection-lens set has one or multiple various projection lenses corresponding to the one or the multiple various fixed images, wherein a central axis of the fixed image and an optical axis of the corresponding projection lens are not on the same axis.

19 Claims, 12 Drawing Sheets

PUDDLE LIGHT

FIELD OF THE INVENTION

The present invention relates to an illumination apparatus, and more particularly to an illumination apparatus for vehicles used as a puddle light.

BACKGROUND OF THE INVENTION

The puddle light (also known as the ground-illumination light) used for cars is typically mounted to the door or the rear-view mirror, such that it turns on and projects images on the ground while the door is opened. It not only generates unique dazzling image-beam and projection images, but also provides the function of illuminating the ground while getting of the car at night, so that people get on and off the car can clearly see the ground, and will not accidentally step on dirt on the ground, puddles, or dangerous terrain.

Although the ground-illumination light will generate unique dazzling image-beam and projection images. If the ground-illumination light only projects a single image, and though the single image may provides a function for illuminating the ground, but it is difficult to meet the pursuit of brilliant psychological needs of drivers as time passes.

SUMMARY OF THE INVENTION

Other objects and advantages of the present invention are described as the features disclosed in the embodiments of the present invention.

An embodiment of the present invention provides an illumination apparatus for vehicles comprising a light source, a fixed-image light valve, and a projection-lens set. The light source generates illumination light of multiple various areas, and the fixed-image light valve has multiple fixed-patterns in multiple various areas respectively corresponding to the illumination light of the multiple various areas. The projection-lens set has multiple projecting lenses respectively corresponding to the multiple fixed patterns, wherein a center axis of one of the multiple fixed-patterns and an optical axis of the projection lens corresponding thereto are not on the same axis.

Another embodiment of the present invention provides an illumination apparatus for vehicles comprising a light source, a fixed-image light valve, and a projection-lens set. The light source is mounted to the vehicle and configured to generate illumination light. The fixed-image light valve has a fixed-pattern and is disposed on an optical path of the illumination light. The projection-lens set has a projecting lens, wherein a center axis of the fixed-pattern and an optical axis of the projection-lens are not on the same axis.

Yet another embodiment of the present invention provides an illumination apparatus for vehicles comprising a light source, a fixed-image light valve, and a frame. The light source is mounted to the vehicle and configured to generate first illumination light. The fixed-image light valve has a first fixed-pattern and is configured to transform the first illumination light into first image beam. The frame has a first outlet, wherein a optical path of the first image beam leaving the first outlet and a center axis of the first fixed-pattern are not on the same axis.

In the embodiments of the present invention, since the center axis of the fixed pattern and the optical axis of the corresponding projection lens are not on the same axis, so that overlapping of multiple projection images can be achieved and thereby a size, a weight and the number of components in the illumination apparatus for vehicles can be significantly reduced. It is beneficial to the miniaturization and thinning of the illumination apparatus for vehicles to thereby incorporate thereof in a variety of micro-electronic devices. Other objects and advantages of the present invention can be further understood from the features disclosed herein. The foregoing and other objects, features and advantages of the present invention can be further understood by the following detailed description in incorporation with the following drawings.

BRIEF DESCRIPTION OF THE DRAWINGS

The present invention will become more readily apparent to those ordinarily skilled in the art after reviewing the following detailed description and accompanying drawings, in which:

FIG. 3-1 is a top view of a fixed-image light valve comprising multiple fixed-patterns according to an embodiment of the invention;

FIG. 3-2 to FIG. 3-4 are figures showing combinations of the projection image of FIG. 3-1;

FIG. 4-1 is an eccentric schematic diagram showing components of a puddle light according to an embodiment of the invention;

FIG. 4-2 is an eccentric schematic diagram showing components of a puddle light according to another embodiment of the invention;

FIG. 5-1 is a top view of a fixed-image light valve comprising multiple fixed-patterns according to an embodiment of the invention; and FIG. 5-2 to FIG. 5-4 are figures showing combinations of the projection image of FIG. 5-1.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The features and advantages of the present invention will be disclosed in following detailed description of the embodiments with reference to the drawings. The directional terms described in the following embodiments such as up, down, left, right, front or rear, etc., refer only to the directions in the figures. Therefore, the use of the terms is for descriptions and is not intended to limit the present invention.

The embodiments of the present invention use the offset manners to project one or multiple projection images to a target position. The embodiments of the present invention are described as follows.

Figure 1:
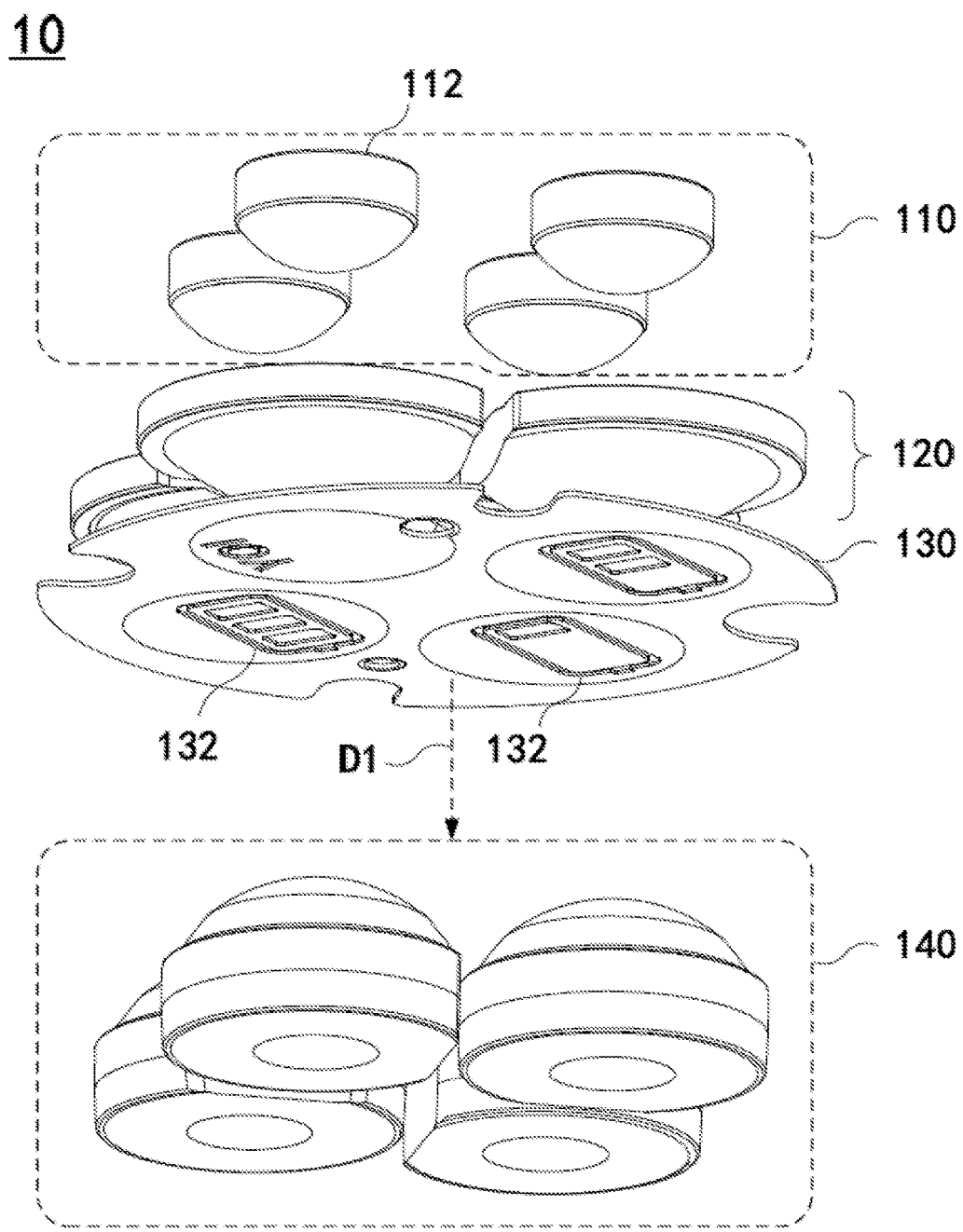
FIG. 1 is a perspective exploded view of a puddle light according to an embodiment of the invention.

FIG. 1 is a perspective exploded view of illumination apparatus for vehicles used as a puddle light according to an embodiment of the invention. As shown in FIG. 1, the illumination apparatus for vehicles 10 comprises a light source 110, a condenser-lens set 120, a fixed-image light valve 130, and a projection-lens set 140. While the light source 110 is lighted up to generate illumination light, the illumination light will pass through the fixed patterns 132 and turns into the image beam, and projection images (not shown in the figure) are then projected. A light-emitting direction of the image beam is illustrated as the straight line D1. In the present embodiment, when the light source 10 comprises multiple illumination elements, for example multiple light-emitting diodes (LEDs) or laser diodes (LDs) collectively packaged in the illumination apparatus for vehicles, illumination light of multiple various areas can be generated by the multiple LEDs, and one of the multiple light emitting elements 112 can be individually lighted up or some or all of the multiple light emitting elements 112 can be lighted up at the same time, and the present invention is not limited thereto. The condenser-lens set 120 is used to condense divergent illumination light generated by the LEDs and project thereof to the fixed-image light valve 130. The condenser-lens set 120 in FIG. 1 is shown as a single lens, but the present invention is not limited thereto. The condenser-lens set 120 can be formed by combining multiple lenses, or the condenser-lens set 120 can be also formed by a lens array. The fixed-image light valve 130 may comprise a projection-sheet set, and the projection-sheet set may comprise multiple various fixed-patterns 132. The projection-sheet set may be formed by a single projection sheet or multiple projection sheets, and the present invention is not limited thereto. The fixed-image light valve 130 can be also a no-power-consumption component such as a holographic sheet. The projection-lens set 140 can be used to image the illuminated pattern image beam so that image beam can be outwardly projected from the illumination apparatus for vehicles 10 The projection-lens set 140 in FIG. 1 is formed by a single lens, but the present invention is not limited thereto. The projection-lens set 140 can be also formed by combinations of multiple lenses, or the projection-lens set 140 can be also formed by a lens array. In the present embodiment, illumination light of multiple various areas is generated by the multiple illumination elements 112, and the optical path of each of the illumination elements 112 is correspond to various fixed-patterns 132, so that when an optical path of illumination light is generated by lighting up one of the illumination element, a projection image (not shown in the figure) projected by transforming the image beam of the corresponding fixed pattern 132 will be generated.

Figure 2:
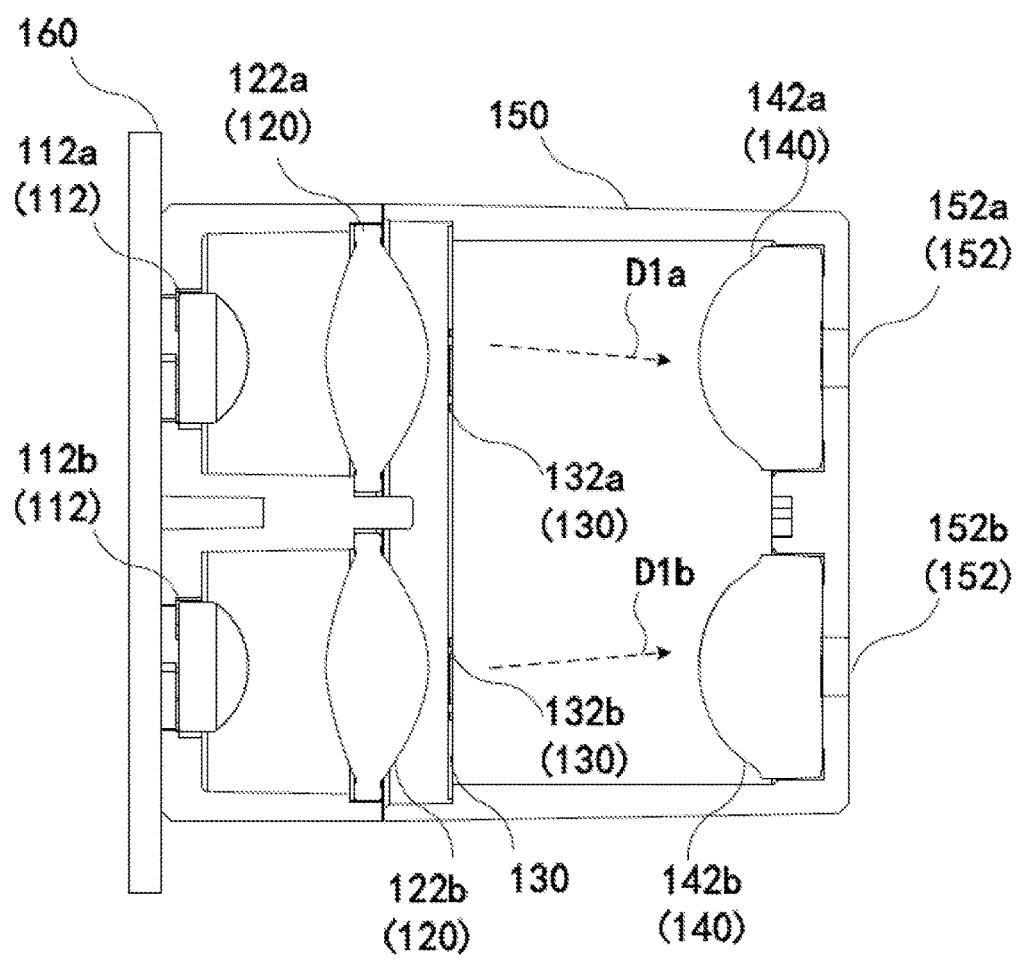
FIG. 2 is a cross-sectional side view of a puddle light according to an embodiment of the invention.

FIG. 2 is a cross-sectional side view of an illumination apparatus for vehicles used as a puddle light according to an embodiment of the invention. As shown in FIG. 2, in one embodiment, in addition to the light source 110, the condenser-lens set 120, the fixed-image light valve 130, and the projection-lens set 140, the illumination apparatus for vehicles 10 further comprises a frame 150 comprising openings 152 and a circuit board 160. Multiple illumination elements 112a and 112b are mounted on the circuit board 160 and the circuit board 160 can be connected to a heat sink (not shown in the figure) to dissipate heat generated by the illumination elements 112a and 112b. The illumination elements 112a and 112b are disposed in the frame 150 and are away from the openings 152. The fixed-image light valve 130 may use a projection sheet. The projection sheet is mounted in the frame 150 and is located between the illumination elements 112 and the openings 152. The projection sheet has multiple fixed patterns 132a and 132b of various areas. Illumination light emitted by the illumination elements 112a and 112b is formed into image beam of corresponding fixed patterns after passing through the corresponding condenser-lens sets 122a and 122b and corresponding fixed-patterns 132a and 132b. The respective light-emitting direction of the illumination light is illustrated as the straight lines D1a and D1b, and the illumination light then passes through the corresponding projection-lens sets 142a and 142b, and the corresponding openings 152a and 152b, thereby causing multiple projection images (not shown in the figure) being simultaneously projected.

Figures 1, 3:
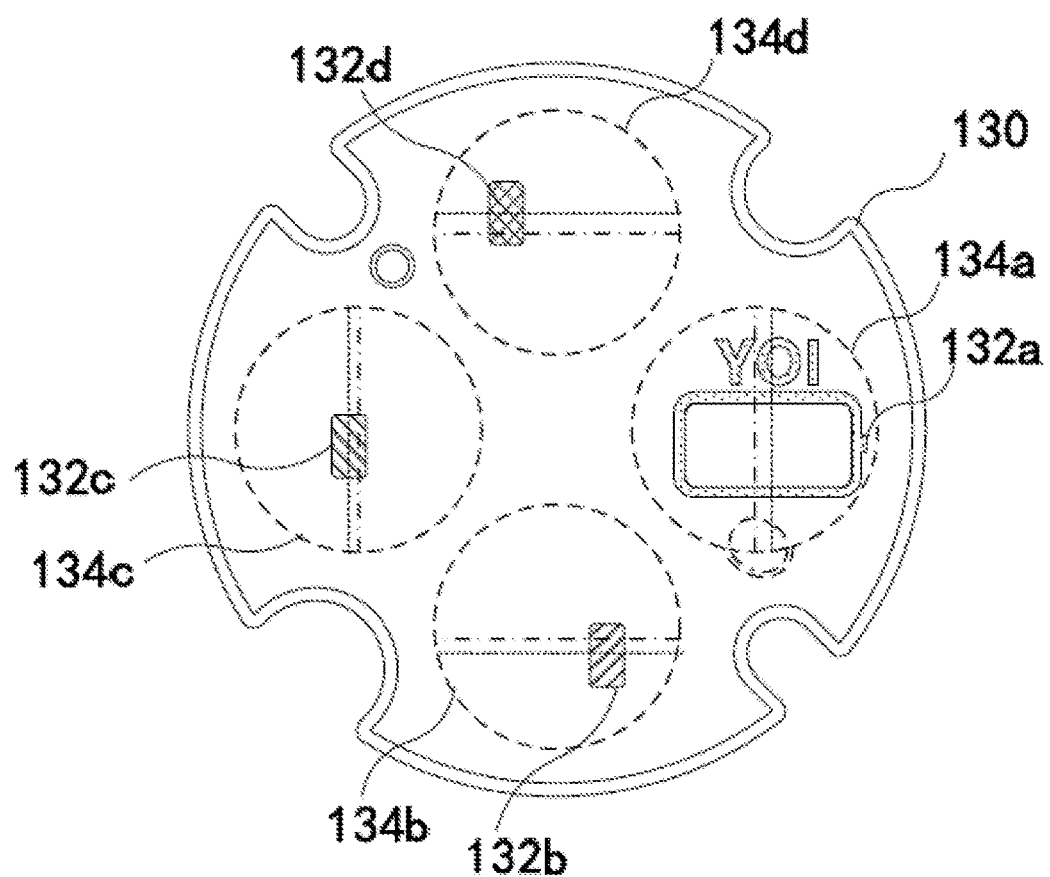
Figures 2, 3:
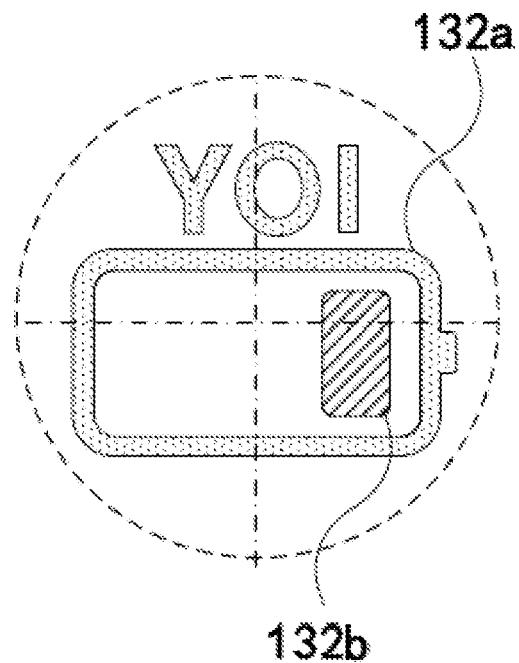
Figure 3:
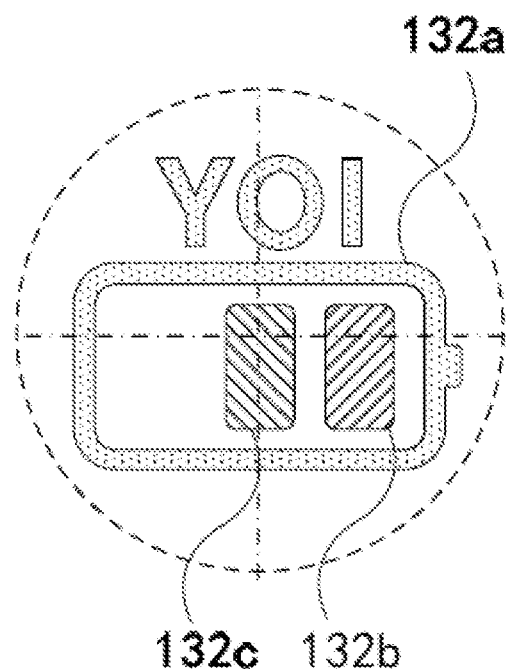

FIG. 3-1 is a top view of a fixed-image light valve comprising multiple fixed-patterns according to an embodiment of the invention. When only the illumination element (not shown in the figure) corresponding to the fixed pattern 132a (YOI and battery patterns) is lighted up, the illumination light generated the illumination element only passes through the circle 134a and forms image beam of the fixed pattern 132a. If the illumination element is an white light LED, and only the fixed pattern 132a (YOI and battery patterns) in the circle 134a is a light-transmitting transparent pattern and the remaining portions are light-shielding patterns, so that the projection image projected on the ground is presented as white YOI and battery patterns. When only the illumination element (not shown in the figure) corresponding to the fixed pattern 132b (the right rectangle located in the battery pattern) is lighted up, the illumination light generated by the illumination element only passes through the circle 134b and forms image beam of the fixed pattern 132b. If the illumination element is a red light LED, and only the fixed pattern 132b (the right rectangle located in the battery pattern) in the circle 134b is a light-transmitting transparent pattern and the remaining portions are light-shielding patterns, so that the projection image projected on the ground is presented as a red rectangle (not shown in the figure). Similarly, when only the illumination element (not shown in the figure) corresponding to the fixed pattern 132c (the middle rectangle located in the battery pattern) is lighted up, the illumination light generated by the illumination element only passes through the circle 134c and forms image beam of the fixed pattern 132c. If the illumination element is a blue light LED, and only the fixed pattern 132c (the middle rectangle located in the battery pattern) in the circle 134c is a light-transmitting transparent pattern and the remaining portions are light-shielding patterns, so that the projection image projected on the ground is presented as a blue rectangle. At last, when only the illumination element (not shown in the figure) corresponding to the fixed pattern 132d (the left rectangle located in the battery pattern) is lighted up, the illumination light generated by the illumination element only passes through the circle 134d and forms image beam of the fixed pattern 132d. If this illumination element is a green light LED, and only the fixed pattern 132d (the middle rectangle located in the battery pattern) in the circle 134d is a light-transmitting transparent pattern and the remaining portions are light-shielding patterns, so that the projection image projected on the ground is presented as a green rectangle.

Figures 3, 4:
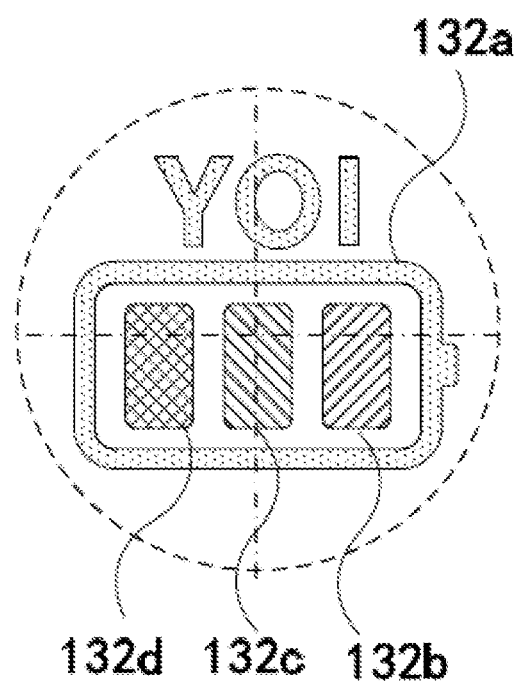
Figures 1, 4:
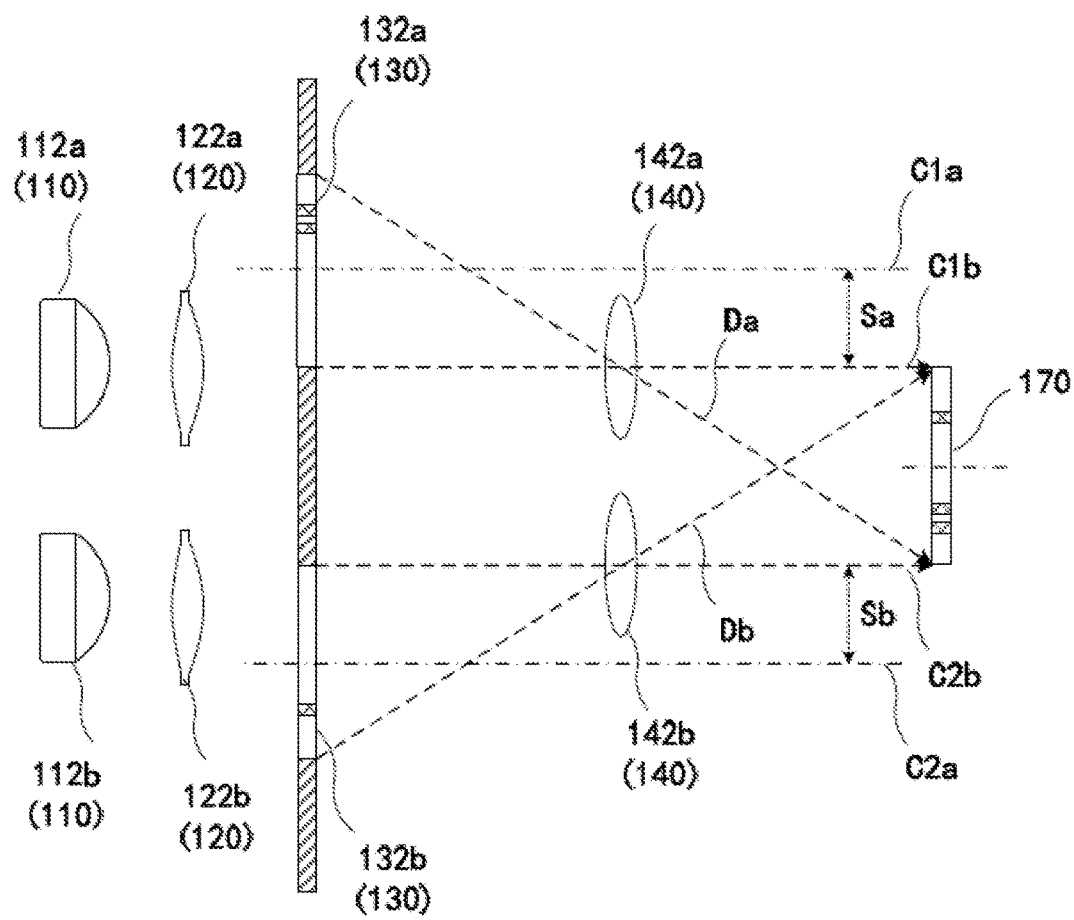
Figures 2, 4:
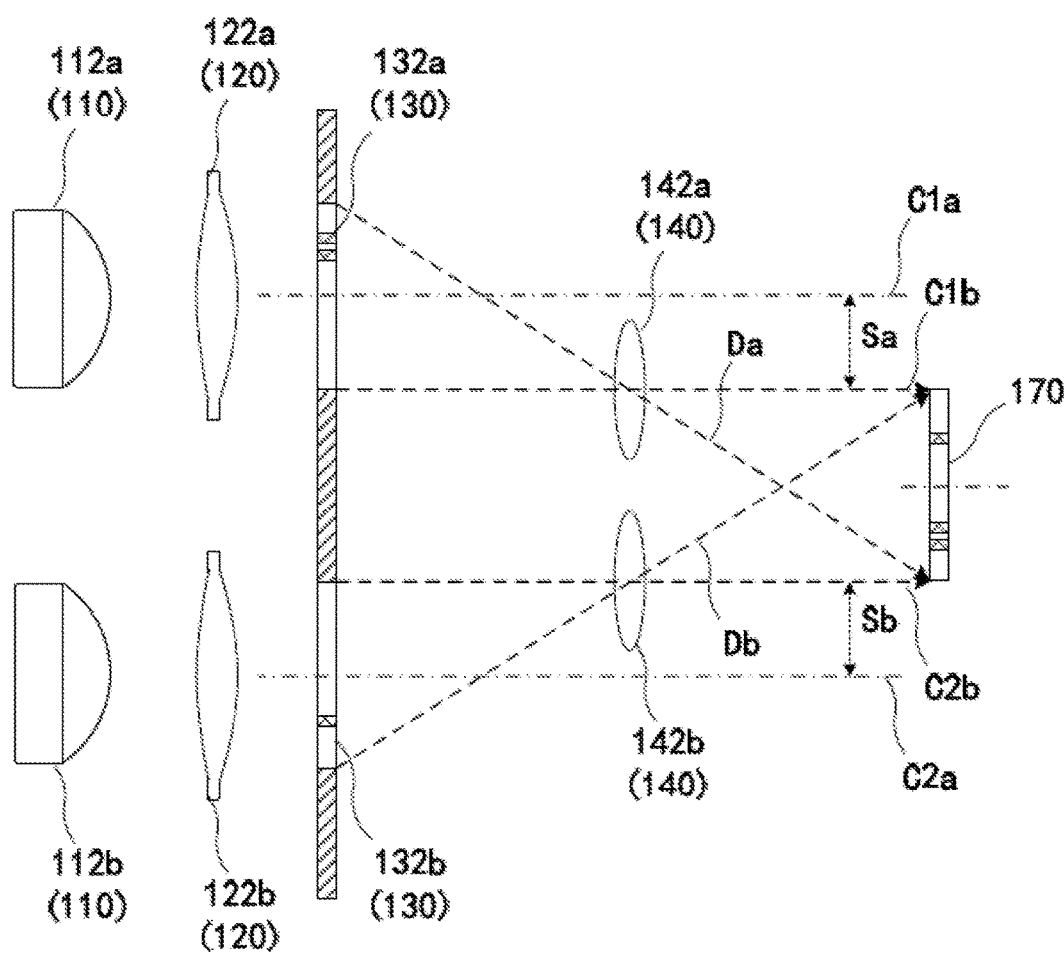

Thus, when the illumination elements of the four colors corresponding to the fixed patterns 132a, 132b, 132c and 134d in FIG. 3-1 are simultaneously lighted up, the projection image projected on the ground is presented as a combination of the white YOI and battery patterns, the red rectangle, the blue rectangle, and the green rectangle, as shown in FIG. 3-4. At this time, a unique dazzling multi-color pattern meeting the needs is thus presented. Similarly, when the illumination elements of two colors (white and red) corresponding to the fixed patterns 132a and 132b are simultaneously lighted up, the projection image projected on the ground is presented as a combination of the white YOI and battery patterns, and the red rectangle, as shown in FIG. 3-2. At last, when the illumination elements of three colors (white, red and blue) corresponding to the fixed patterns 132*a*, 132*b* and 132 in FIG. 3-1 can simultaneously lighted up, the projection image projected on the ground is presented as a combination of the white YOI and battery patterns, the red rectangle, and the blue rectangle, as shown in FIG. 3-3.

The optical components of the present invention are formed in the offset manners as shown in FIGS. 4-1 and 4-2, so that combinations of the projection images as shown in FIG. 3-2 to FIG. 3-4 can be projected. Referring to FIG. 4-1, in an embodiment of the present invention, a center axis of the illumination element 112*a*, an optical axis of the condenser-lens set 122*a* and an optical axis of the projection-lens set 142*a* are on the same axis C1*b*, but a center axis C1*a* of the fixed-pattern 132*a* and the axis C1*b* have an amount of deviation Sa away from the illumination element 112*b*. Similarly, a center axis of the illumination element 112*b*, an optical axis of the condenser-lens set 122*b* and an optical axis of the projection-lens set 142*b* are on the same axis C2*b*, but a center axis C2*a* of the fixed-pattern 132*b* and the axis C2*b* have an amount of deviation Sb away from the illumination element 112*b*. Through the offset designs between the optical axis of the projection-lens set and the center axis of the fixed pattern, the image beam Da and Db leaving the projection-lens set 142*a* and 142*b* can be offset toward the center, so that the projection images of the fixed patterns 132*a* and 132*b* can be overlapped on the target position 170 as shown in FIG. 3-2 to FIG. 3-4.

Referring to FIG. 4-2, in another embodiment of the present application, a center axis of the illumination element 112*a*, an optical axis of the condenser-lens set 122*a* and a center axis of the fixed pattern 132*a* are on the same axis C1*a*, but a center axis C1*b* of the projection-lens set 142*a* and the axis C1*a* have an amount of deviation Sa away from the illumination element 112*b*. Similarly, a center axis of the illumination element 112*b*, an optical axis of the condenser-lens set 122*b* and a center axis of the fixed pattern 132*b* are on the same axis C2*a*, but a center axis C2*a* of the projection-lens set 142*a* and the axis C2*b* have an amount of deviation Sb away from the illumination element 112*a*. Through the offset designs between the optical axis of the projection-lens set and the center axis of the fixed pattern, the image beam Da and Db leaving the projection-lens set 142*a* and 142*b* can be offset toward the center, so that the projection images of the fixed patterns 132*a* and 132*b* can be overlapped on the target position 170 as shown in FIG. 3-2 to FIG. 3-4.

It is noted that the projection images of the plurality of fixed patterns can be overlapped on the target position not only by individually offsetting the center axis of the fixed pattern 130 or the optical axis of the projection-lens set 140, but also by simultaneously offsetting the center axis of the fixed patterns 130 and the optical axis of the projection-lens set 140, and the present invention are not limited thereto. In addition, the direction for offsetting the fixed patterns 130 and the projection-lens set 140 are not limited, and it can be multiple close-overlapped or away projection images.

Figures 1, 5:
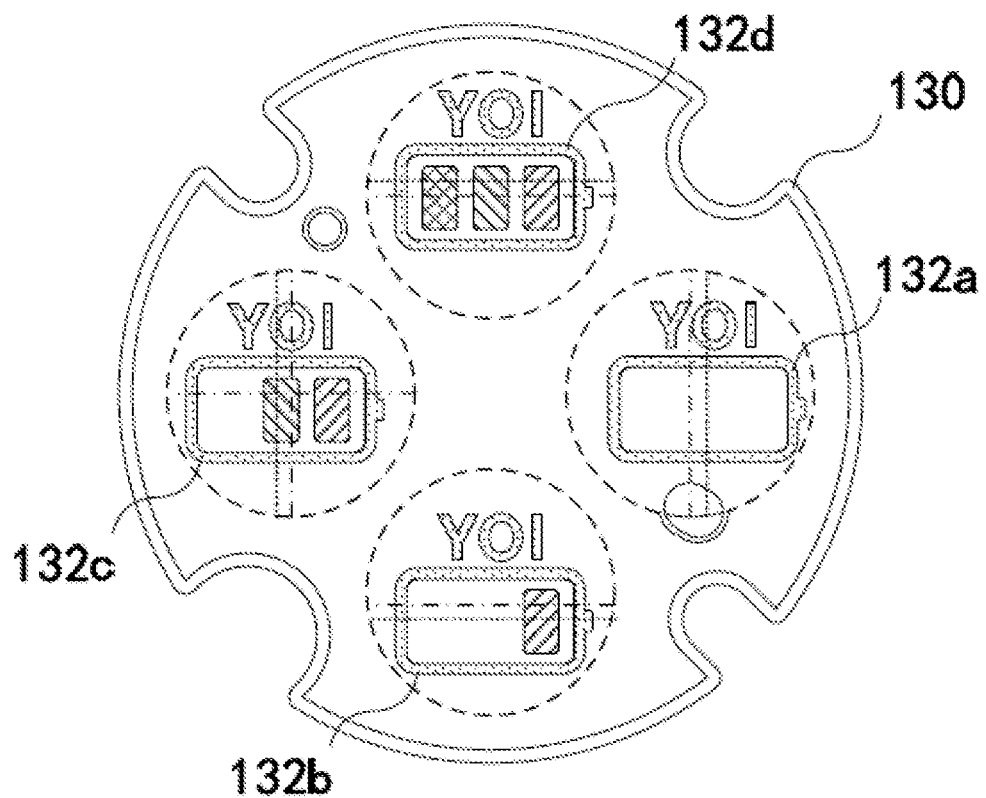
Figures 2, 5:
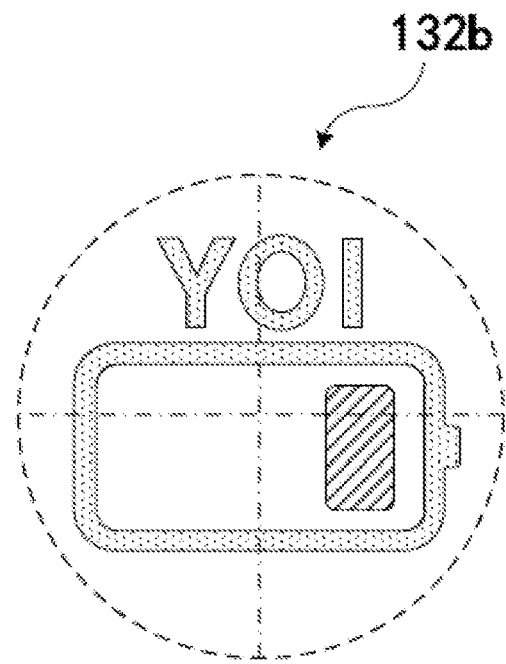
Figures 3, 5:
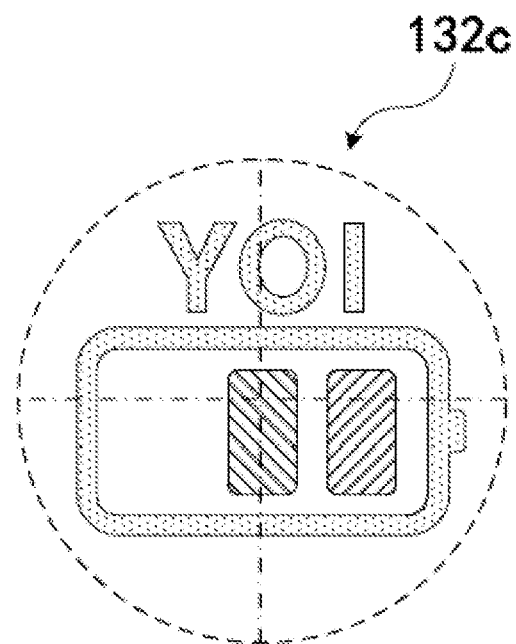
Figures 4, 5:
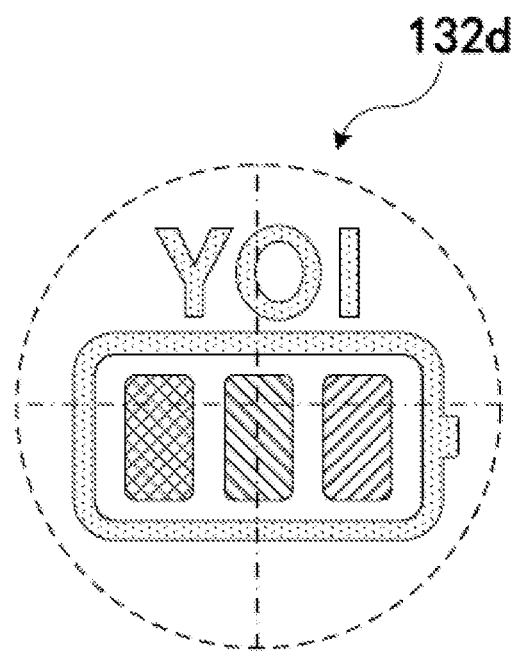

FIG. 5-1 is a top view of a fixed-image light valve comprising multiple fixed-patterns according to an embodiment of the invention. When only the illumination element (not shown in the figure) corresponding to the fixed pattern 132*a* (YOI and battery patterns) is lighted up, and image beam of the fixed pattern 132*a* is generated. If this illumination element is an white light LED, and only the YOI and battery patterns of the fixed pattern 132*a* in the dotted-line circle are light-transmitting white light transparent patterns and the remaining portions are light-shielding patterns, so that the projection image projected on the ground is presented as white light YOI and battery patterns (not shown in the figure). When only the illumination element (not shown in the figure) corresponding to the fixed pattern 132*b* (YOI and battery patterns, and the right rectangle in the battery pattern) is lighted up, and image beam of the fixed pattern 132*b* is generated. If this illumination element is a white light LED, and YOI and battery patterns of the fixed pattern 132*b* in the dotted-line circle is light-transmitting white light transparent pattern and the right rectangle in the battery pattern is light-transmitting red light transparent pattern, and the remaining portions are light-shielding patterns, so that the projection image projected on the ground is presented as white light YOI and battery patterns and a red right rectangle in the battery pattern, as shown in FIG. 5-2. Similarly, when only the illumination element (not shown in the figure) corresponding to the fixed pattern 132*c* (YOI and battery patterns, and the middle rectangle and the right rectangle in the battery pattern) is lighted up, and image beam of the fixed pattern 132*c* is generated. If this illumination element is a white light LED, and the YOI and battery patterns of the fixed pattern 132*c* in the dotted-line circle is light-transmitting white light transparent pattern, the right rectangle in the battery pattern is light-transmitting red light transparent pattern, and the middle rectangle in the battery pattern is light-transmitting blue light transparent pattern, and the remaining portions are light-shielding patterns, so that the projection image projected on the ground is presented as white light YOI and battery patterns, the red right rectangle and the blue middle rectangle, as shown in FIG. 5-3. At last, when only the illumination element (not shown in the figure) corresponding to the fixed pattern 132*d* (YOI and battery patterns, and the middle rectangle, the right rectangle and the left rectangle in the battery pattern) is lighted up, and image beam of the fixed pattern 132*d* is generated. If this illumination element is a white light LED, and YOI and battery patterns of the fixed pattern 132*d* in the dotted-line circle is light-transmitting white light transparent pattern, the right rectangle in the battery pattern is light-transmitting red light transparent pattern, the middle rectangle in the battery pattern is light-transmitting blue light transparent pattern, the left rectangle in the battery pattern is light-transmitting blue light transparent pattern, and the remaining portions are light-shielding patterns, so that the projection image projected on the ground is presented as white light YOI and battery patterns, the red right rectangle, the blue middle rectangle, and the green left rectangle, as shown in FIG. 5-4

In order to make the projection images generated by the multiple fixed-patterns 132*a*, 132*b*, 132*c*, and 132*d* shown in FIG. 5-1 to be projected to the target location, so that the corresponding optical components are needed to be arranged in the offset manners as shown in FIGS. 4-1 and 4-2 and as described above, and are not described again here.

It is to be noted that the individual features mentioned in the various embodiments of the present invention are not limited to the features depicted or described in the embodiments. That is, these features can be used in various other embodiments or other aspects of the present invention which are not illustrated, and are not limited thereto. For example, a reflection lens can be correspondingly added between the projection-lens set 140 and the outlet 152 to change the optical path of the image beam and to achieve overlapping of multiple projection images. At this time, the center axis of the fixed pattern 130 and the optical axis of the projection-lens set 140 can be offset or not offset, and the present invention is not limited thereto. In addition, the reflection lens can be replaced by other optical components such as a prism, or the shape and material of the frame can be modified to offset the optical path of the image beam toward the center axis of the frame 150 and the image beam then projected from the outlet 150 to achieve overlapping of multiple projection images, and the present invention is not limited thereto. By moving locations of the illumination elements 112 or adjusting angles of the illumination elements 112, the number of the illumination elements 112 can be reduced to thereby reduce the size, the weight and the number of components in the illumination apparatus for vehicles that incorporates more fixed-patterns 130.

In the illumination apparatus for vehicles of the present invention, a plurality type of projection image can be produced by various embodiments through combinations of the fixed-image light valve and the projection-lens set. Therefore, more simple but more efficient parts can be used to achieve overlapping of multiple projection images with a reduced size. This not only provides the function of ground illumination, and overlapping of the projection images brings people with bright and dazzling sense of surprise. The illumination apparatus for vehicles provided by the present application may significantly reduce a size, a weight and the number of components in the illumination apparatus for vehicles. It is beneficial to the miniaturization and thinning of the illumination apparatus for vehicles to thereby incorporate thereof in a variety of micro-electronic devices.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A puddle light mounted to a vehicle, comprising:
a light source configured to generate illumination light of a plurality of various areas;
a fixed-image light valve, having a plurality of fixed-patterns of a plurality of various areas respectively corresponding to the plurality of various areas of illumination light, disposed on optical paths of the illumination light of the plurality of various areas, wherein the fixed-image light valve is physically required to be fixed in place relative to the light source, and the plurality of fixed-patterns do not change over time; and
a projection-lens set, having a plurality of projecting lenses respectively corresponding to the plurality of fixed patterns, wherein a center axis of one of the plurality of fixed-patterns and an optical axis of the projection lens corresponding thereto are not on the same axis.

2. The puddle light according to claim 1, wherein the light source comprises a plurality of illumination elements.

3. The puddle light according to claim 2, wherein the illumination elements are light-emitting diodes or laser diodes.

4. The puddle light according to claim 1, wherein the fixed-image light valve is selected from one of a projection-sheet set and a holographic sheet.

5. The puddle light according to claim 1, wherein the puddle light further comprises a condenser-lens set.

6. The puddle light according to claim 5, wherein the condenser-lens set is selected from one of a single lens, a multi-lens, and a lens array.

7. A puddle light mounted to a vehicle, comprising:
a light source configured to generate illumination light;
a fixed-image light valve, having a fixed-pattern, disposed on an optical path of the illumination light, wherein the fixed-image light valve is physically required to be fixed in place relative to the light source, and the fixed-pattern does not change over time; and
a projection-lens set, having a projecting lens, wherein a center axis of the fixed-pattern and an optical axis of the projection-lens are not on the same axis.

8. The puddle light according to claim 7, wherein the light source comprises a plurality of illumination elements.

9. The puddle light according to claim 8, wherein the illumination elements are light-emitting diodes or laser diodes.

10. The puddle light according to claim 7, wherein the fixed-image light valve is selected from one of a projection-sheet set and a holographic sheet.

11. The puddle light according to claim 7, wherein the puddle light further comprises a condenser-lens set.

12. The puddle light according to claim 11, wherein the condenser-lens set is selected from one of a single lens, a multi-lens, and a lens array.

13. A puddle light mounted to a vehicle, comprising:
a light source configured to generate first illumination light;
a fixed-image light valve, having a first fixed-pattern, configured to transform the first illumination light into first image beam, wherein the fixed-image light valve is physically required to be fixed in place relative to the light source, and the first fixed-pattern does not change over time; and
a frame, having a first outlet, wherein an optical path of the first image beam leaving the first outlet and a center axis of the first fixed-pattern are not on the same axis.

14. The puddle light according to claim 13, further comprising:
second illumination light generated by the light source;
a second fixed-pattern disposed in the fixed-image light valve, configured to transform the second illumination light into second image beam, wherein the second fixed-pattern does not change over time; and
a second outlet disposed in the frame, wherein an optical path of the second image beam leaving the second outlet and a center axis of the second fixed-pattern are not on the same axis, and the optical path of the first image beam leaving the first outlet overlaps or is away from the optical path of the second illumination light leaving the second outlet.

15. The puddle light according to claim 14, wherein the puddle light further comprises a projection-lens set, having a first projection-lens and a second projection-lens respectively corresponding to the first fixed-pattern and the second fixed-pattern, wherein a center axis of the first fixed-pattern and an optical axis of the first projection-lens axis are offset.

16. The puddle light according to claim 13, wherein the light source comprises a plurality of illumination elements.

17. The puddle light according to claim 13, wherein the fixed-image light valve is selected from one of a projection-sheet set and a holographic sheet.

18. The puddle light according to claim 13, wherein the puddle light further comprises a condenser-lens set.

19. The puddle light according to claim 18, wherein the condenser-lens set is selected from one of a single lens, a multi-lens, and a lens array.

* * * * *